United States Patent
Narin et al.

(10) Patent No.: US 9,118,170 B2
(45) Date of Patent: Aug. 25, 2015

(54) ELECTRICAL SWITCHGEAR, IN PARTICULAR SWITCHGEAR FOR MEDIUM VOLTAGE

(75) Inventors: Gueven Narin, Frankfurt (DE); Rainer Stein, Regensburg (DE); Franz Lang, Lapperdorf (DE); Frank Wrobel, Donaustauf (DE)

(73) Assignee: SCHNEIDER ELECTRIC SACHSENWERK GMBH, Regensburg (DE)

( * ) Notice: Subject to any disclaimer, the term of this patent is extended or adjusted under 35 U.S.C. 154(b) by 493 days.

(21) Appl. No.: 13/064,819

(22) Filed: Apr. 19, 2011

(65) Prior Publication Data

US 2011/0261506 A1 Oct. 27, 2011

(30) Foreign Application Priority Data

Apr. 21, 2010 (DE) .......................... 10 2010 017 914
Apr. 8, 2011 (DE) .......................... 10 2011 007 062

(51) Int. Cl.
H02B 1/26 (2006.01)
H02B 13/035 (2006.01)
H02B 1/22 (2006.01)

(52) U.S. Cl.
CPC ................ *H02B 13/035* (2013.01); *H02B 1/22* (2013.01)

(58) Field of Classification Search
USPC ......... 361/601–602, 605, 611, 614, 622, 624, 361/627, 633–637, 641, 644, 648, 652, 656, 361/673
See application file for complete search history.

(56) References Cited

U.S. PATENT DOCUMENTS

| | | | |
|---|---|---|---|
| 4,241,379 A | 12/1980 | Olsen | |
| 4,256,934 A | 3/1981 | Nogi et al. | |
| 5,070,428 A | 12/1991 | Harz et al. | |
| 6,301,095 B1 * | 10/2001 | Laughlin et al. | 361/624 |
| 7,542,268 B2 * | 6/2009 | Johnson, Jr. | 361/622 |
| 8,570,714 B2 * | 10/2013 | Weighell et al. | 361/621 |
| 2002/0008084 A1 | 1/2002 | Arioka et al. | |
| 2010/0328850 A1 * | 12/2010 | Remmert | 361/634 |
| 2011/0136353 A1 * | 6/2011 | Spitaels et al. | 439/95 |
| 2011/0310534 A1 * | 12/2011 | Cosley et al. | 361/632 |
| 2012/0162862 A1 * | 6/2012 | Cosley et al. | 361/644 |

FOREIGN PATENT DOCUMENTS

| | | |
|---|---|---|
| DE | 917621 A | 9/1954 |
| DE | 1120541 A | 12/1961 |
| DE | 2342123 A1 | 2/1975 |
| DE | 2733777 C2 | 2/1979 |
| DE | 2754691 A1 | 6/1979 |
| DE | 2931459 A1 | 3/1980 |
| DE | 2924430 A1 | 12/1980 |
| DE | 3840850 A1 | 6/1990 |
| DE | 19511349 C1 | 9/1996 |

OTHER PUBLICATIONS

German Office Action mailed Nov. 8, 2013 and received Nov. 14, 2013 for a corresponding German application No. 10 2010 017 914.0 4.

* cited by examiner

*Primary Examiner* — Courtney Smith
(74) *Attorney, Agent, or Firm* — Harness, Dickey & Pierce, P.L.C.

(57) ABSTRACT

Described is a distribution panel for electrical switchgear, in particular for medium-voltage distribution switchgear. The distribution panel is provided, in at least one embodiment, with at least one bus bar and at least one transfer rail, wherein the bus bar is connected via a circuit breaker to an outlet terminal and wherein the transfer rail is also connected to the outlet terminal. The circuit breaker, in at least one embodiment, is housed inside a circuit breaker housing and the transfer rail and the electrical connection from the transfer rail to the outlet terminal are arranged so as to bypass the circuit breaker housing.

18 Claims, 2 Drawing Sheets

ELECTRICAL SWITCHGEAR, IN PARTICULAR SWITCHGEAR FOR MEDIUM VOLTAGE

PRIORITY STATEMENT

The present application hereby claims priority under 35 U.S.C. §119 on German patent application numbers DE 10 2010 017 914.0 filed Apr. 21, 2010 and DE 10 2011 007 062.1 filed Apr. 8, 2011, the entire contents of each of which are hereby incorporated herein by reference.

FIELD

At least one embodiment of the invention generally relates to electrical switchgear, a switchgear distribution panel, and/or a method for operating the switchgear or the switchgear distribution panel.

BACKGROUND

An electrical switchgear is generally known. The distribution panels of the switchgear function to distribute electrical power to the connected consumers. In case of a malfunction or defect in one of the switchgear distribution panels, the circuit breaker provided in this panel is intended to protect the system by moving to the opened state, thereby interrupting the current flow from the bus bar to the connected consumer. With the aid of corresponding switching-technological measures, it is possible to continue the current flow to the consumer via the transfer rail while the problem is corrected.

SUMMARY

In at least one embodiment of the present invention, an electrical switchgear and/or a switchgear distribution panel is provided which, on the one hand, allows the flow of current to the consumer to continue even if a malfunction occurs and, on the other hand, makes it easy to correct any malfunction that has already occurred.

At least one embodiment of the invention is directed to an electrical switchgear, a distribution panel for the switchgear, and/or a method for operating the switchgear or the switchgear distribution panel.

According to at least one embodiment of the invention, the circuit breaker is installed inside the housing for a circuit breaker, and the transfer rail as well as the electrical connection from the transfer rail to the outlet terminal are arranged so as to bypass the circuit breaker housing.

By installing the circuit breaker inside the circuit breaker housing, as well as arranging the transfer rail and the electrical connection to bypass the circuit breaker housing, it is possible to work on the circuit breaker for maintenance purposes or to correct malfunctions without influencing the transfer rail, or vice versa. In particular, a defective circuit breaker can be replaced in this way without having to take into consideration the transfer rail or the electrical connection from the transfer rail to the outlet terminal.

On the one hand, the flow of current to the consumer can thus continue via the transfer rail while, on the other hand, simple maintenance can be performed or a malfunction can be corrected without problem, in particular the circuit breaker can be replaced without problem.

According to one advantageous embodiment of the invention, respectively one disconnecting/grounding switch is provided on each side of the circuit breaker. As a result, a simple disconnecting and grounding of the circuit breaker within the switchgear panel is possible, so that the circuit breaker can subsequently be uninstalled easily, for example for replacing it with a new circuit breaker.

It is especially advantageous if the circuit breaker is connected via one of the disconnecting/grounding switches to the bus bar and is connected via the other disconnecting/grounding switch to the outlet terminal, in particular if the bus bar and one of the disconnecting/grounding switches are installed inside a housing for the bus bar and the other disconnecting/grounding switch is installed in a housing for the distribution panel. The disconnecting/grounding switches are thus housed outside of the circuit breaker housing, thereby making it possible to work on the circuit breaker or the circuit breaker housing without problem and, in particular, making it easy to replace the circuit breaker.

According to one advantageous modification of at least one embodiment of the invention, the transfer rail is also housed inside a housing, wherein it is particularly advantageous if the transfer rail is connected to a disconnecting switch that is preferably also housed inside the transfer-rail housing. As a result, only the circuit breaker for which current is supposed to flow through its associated transfer rail must be closed.

BRIEF DESCRIPTION OF THE DRAWINGS

Additional features, options for use and advantages of the invention follow from the description below of example embodiments of the invention which are shown in the Figures of the drawings. All described or illustrated features by themselves or in any optional combination herein represent the subject matter of the invention, regardless of how they are combined in the patent claims or how they refer back, as well as independent of their formulation and/or representation in the description and/or the drawings.

DETAILED DESCRIPTION OF THE EXAMPLE EMBODIMENTS

Figure 1:
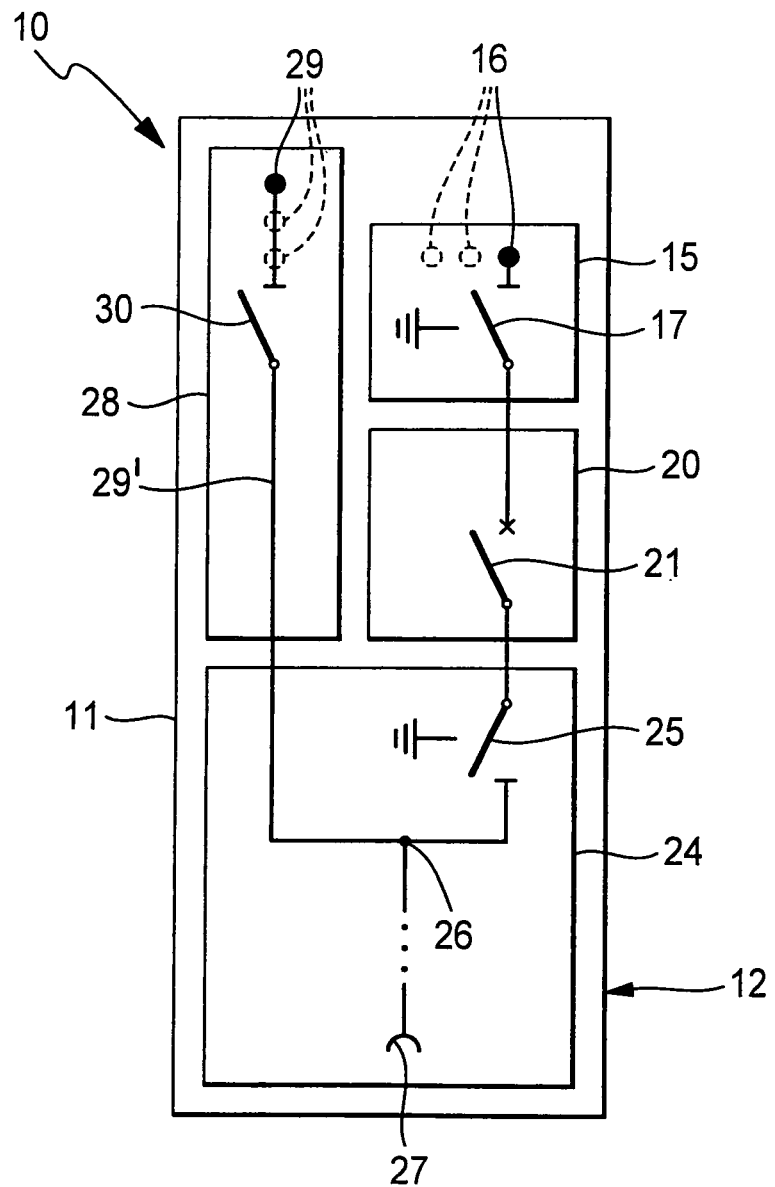
FIG. 1 of the drawing is a schematic block diagram of an example embodiment of a distribution panel for the electrical switchgear according to the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Electrical switchgear, especially switchgear used for medium voltage distribution, includes a plurality of switch panels. These switch panels can be feed-in panels by which electrical power is fed into the switchgear, or they can be distribution panels by which the fed-in electrical power is distributed to the consumers. The switch panels are electrically connected via bus bars. In dependence on their use, different electrical components are installed in the individual switch panels, for example circuit breakers, disconnecting/grounding switches and the like.

The electrical switchgear can be embodied as three-phase switchgear. However, it is understood that the electrical switchgear can also be embodied as two-phase or single phase switchgear.

FIG. 1 shows a view from the side of a single distribution panel 10 for switchgear provided with three phases. For the purpose of simplification, only one phase is shown herein for the panel 10 in FIG. 1. It is understood that the components explained in the following for the switchgear panel 10 are correspondingly present multiple times.

The switchgear panel 10 is provided with a box-type metal housing 11 which is erected on horizontal ground. The vertical wall 1 of the housing 11, shown on the right in FIG. 1, represents the front portion 12 of the switch panel 10.

Three bus bars 16 extend through the bus bar housing 15 of the switchgear panel 10, wherein these bus bars are oriented perpendicular to the drawing plane in FIG. 1 and are arranged approximately horizontal, one behind the other, as seen from the vertical front 12. The bus bar housing 15 is arranged in the upper section of the housing 11 and is arranged on its front 12. The bus bar housing 15 is sealed gas-tight and is filled with an insulating gas, for example SF6.

Alternatively, it is also possible for the bus bar housing 15 to be sealed fluid-tight and to be filled with an insulating fluid, or to provide a solid insulation material, or to have air-insulated compartments. It is understood that a combination of these can also be used.

Furthermore positioned in the bus bar housing 15 are three disconnecting/grounding switches 17 that are assigned to the bus bars 16. The disconnecting/grounding switches 17 in this case are grounded against the grounded housing 11 of the switchgear panel 10.

Three circuit breakers 21 are installed inside a circuit breaker housing 20 of the switchgear panel 10 and can, for example, be vacuum circuit breakers. With the aid of respectively one of the disconnecting/grounding switches 17, each of the three circuit breakers 21 can either be connected to one of the three bus bars 16 or connected to ground. The circuit breaker housing 20 is arranged below the bus bar housing 15 on the front 12 of the switchgear panel 10. The circuit breaker housing 20 is sealed gas-tight and filled with an insulating gas, for example SF6.

Alternatively, it is also possible to have a fluid-tight circuit breaker housing 20 which is filled with an insulating fluid, or to provide solid insulation material, or to have air-insulated compartments. It is understood that combinations thereof can be used as well.

In a manner not shown herein, a switching mechanism is assigned to each of the circuit breakers 21, wherein this mechanism functions to turn the circuit breaker 21 on and off. Each of the circuit breakers 21 has a longitudinal axis which simultaneously represents essentially the direction of activation for the switching mechanism of the circuit breaker 21. This longitudinal axis is oriented approximately horizontal and rests approximately perpendicular on the vertical front 12 of the switchgear panel 10. The three circuit breakers 21 and the associated switching mechanisms are respectively arranged perpendicular to the drawing plane in FIG. 1 and thus respectively horizontal and side by side, as seen from the front 12.

The circuit breaker housing 20 and the three circuit breakers 21 are embodied such that all three circuit breakers 21 can be replaced jointly or such that each of the circuit breakers 21 can be replaced individually. For this, the circuit breaker housing 20 can be opened from the front 12 of the switchgear panel 10. The electrical connections for the circuit breaker(s) 21 to be replaced can be disconnected and the circuit breaker(s) 21 can be removed from the front 12 of the circuit breaker housing 20, for example with the aid of a lifting carriage or truck. A new circuit breaker 21 can subsequently be installed in the reverse sequence in the housing 20.

Arranged below the circuit breaker housing 20 is a distribution panel housing 24 which contains at least three disconnecting/grounding switches 25. The distribution panel housing 24 extends from the front 12 over the total depth of the switchgear panel 10, is sealed gas-tight and is filled with an insulating gas such as SF6.

Alternatively, the distribution panel housing 24 can also be sealed fluid-tight and can be filled with an insulating fluid, or a solid insulation material can be provided, or air-insulated compartments can be used. It is understood that a combination thereof is possible as well.

The disconnecting/grounding switch 25 is grounded against the grounded housing 11 of the switchgear panel 10.

Each of the three disconnecting/grounding switches 25 is connected on one side to respectively one of the circuit breakers 21 and can thus be connected via the respectively other disconnecting/grounding switches 17 to the respectively associated bus bar 16. On the other hand, each of the three circuit breakers 21 is either connected via respectively one of the disconnecting/grounding switches 25 to a connecting point 26 or they can be connected to ground.

The distribution panel housing 24 can furthermore also accommodate the respectively required number of additional electrical components, not shown herein, such as current converters, voltage taps, conically embodied cable connections, test connections, and the like. These components in particular are arranged downstream of the connecting point 26, wherein this is shown with a dotted line in FIG. 1.

The three "outlets" of the distribution panel 10 in FIG. 1 are indicated schematically with the aid of an outlet terminal 27.

Three transfer rails 29 which function as bus bars extend through a transfer rail housing 28, are oriented perpendicular to the drawing plane in FIG. 1 and are arranged approximately horizontal one below the other, as seen from the vertical front 12. The transfer rails 29 can also be embodied or referred to as transfer bus bars or as double bus bars. The transfer rail housing 28 is arranged behind the bus bar housing 15 and the circuit breaker housing 20, as seen from the front 12 of the housing 11. The transfer rail housing 28 is sealed gas-tight and is filled with an insulating gas, for example with SF6.

Alternatively, it is possible to seal the transfer rail housing 28 fluid-tight and to fill it with an insulating fluid, or to use a solid insulation material, or to provide air-insulated compartments. It is understood that combinations thereof are possible as well.

Furthermore housed in the transfer rail housing 28 are three disconnecting switches 30. Each of the disconnecting switches 30 is connected on the one hand to one of the transfer rails 29 and, on the other hand, via an electrical connection 29' to one of the three connecting points 26. The disconnecting switches 30 can also be realized as disconnecting/grounding switches, wherein the connecting point 26 can be connected to ground in that case.

The transfer rails 29 and the disconnecting switches 30 are thus arranged completely separate from the circuit breakers 21 and the circuit breaker housing 20 within the switchgear panel 10. In particular, the transfer rails 29 and their electrical connection 29' to the connecting points 26 are arranged so as to bypass the circuit breaker housing 20. For the above-explained distribution panel 10 in FIG. 1, this is realized in that the electrical connection 29' of the transfer rails 29 to the connecting points 26 extends directly from the transfer rail housing 28 to the distribution panel housing 24.

As a result, it is possible to work on the circuit breaker housing 20 and/or the circuit breakers 21 without having to consider the transfer rails 29 or their electrical connection 29' to the connecting points 26.

Figure 2:
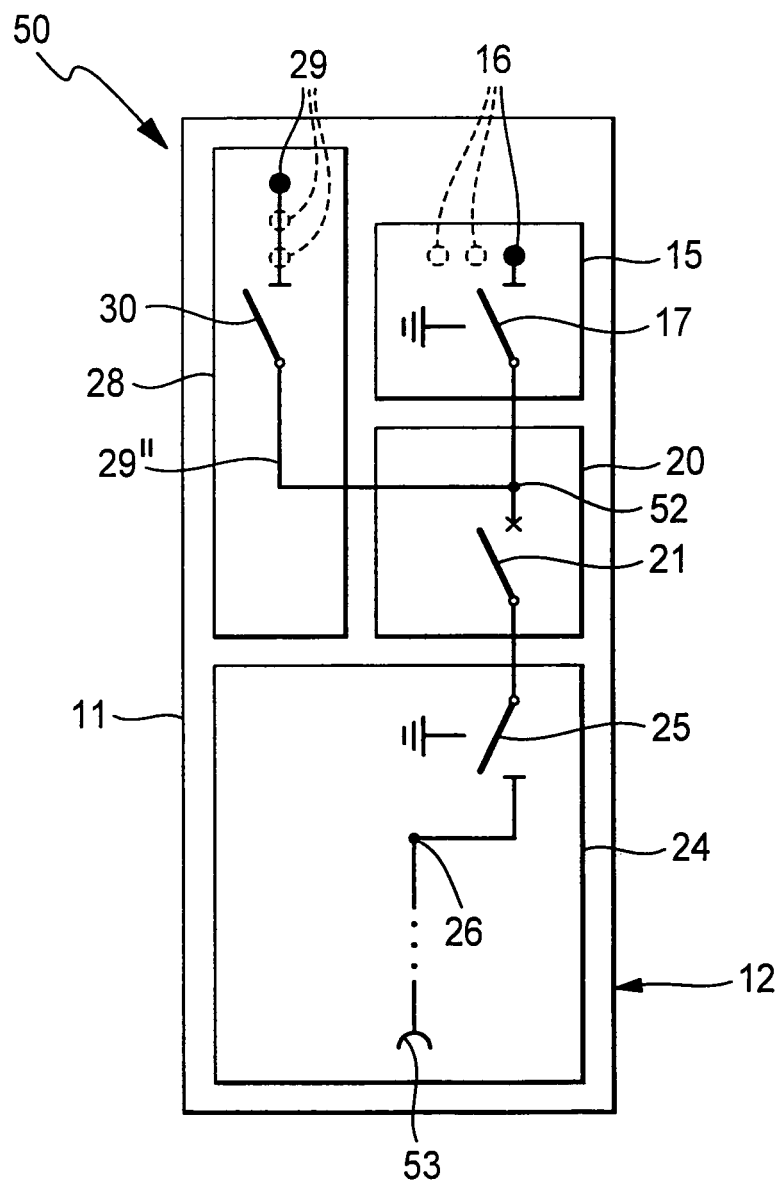
FIG. 2 is a schematic block diagram of an example embodiment of a feed-in panel for the electrical switchgear according to the invention.

In FIG. 2, a single feed-in panel 50 for the three-phase switchgear is shown in a view from the side. For the purpose of simplification, the panel 50 in FIG. 2 is shown with a single phase. It is understood that the following explanations relating to the components of the feed-in panel 50 correspondingly are present multiple times.

The feed-in panel 50 in FIG. 2 is basically configured the same way as the distribution panel 10 in FIG. 1. For that reason, the same identical components are given the same reference numbers in the following and only those components of the feed-in panel 50 in FIG. 2 are described which differ from those of the distribution panel 10 in FIG. 1. With respect to all other features of the feed-in panel 50 in FIG. 2 we refer to the explanations provided for the distribution panel 10 in FIG. 1.

In contrast to the distribution panel 10 in FIG. 1, the disconnecting switches 30 of the transfer rail housing 28 for the feed-in panel 50 in FIG. 2 are not connected to the respective connecting points 26 in the distribution panel housing 24. Rather, the disconnecting switches 30 are connected via electrical connections 29" with respectively associated connecting points 52 in the circuit breaker housing 20. These connecting points 52 are arranged between the respective disconnecting/grounding switch 17 of the bus bar housing 15 and the associated circuit breaker 21 in the circuit breaker housing 20. Thus, for the feed-in panel 50 in FIG. 2, the electrical connections 29" of the transfer rails 29 to the associated connecting points 52 are not arranged so as to bypass the circuit breaker housing 20.

Alternatively, the transfer rails 29 can also be connected not inside the circuit breaker housing 20, but in a manner not shown herein to the connecting points 52 within the bus bar housing 15. In that case, the electrical connections 29" of the transfer rails 29 to the associated connecting points 52 are arranged so as to bypass the circuit breaker housing 20, wherein the electrical connections 29" from the transfer rails 29 to the connecting points 52 extend directly from the transfer rail housing 28 to the bus bar housing 15.

The above-described options have in common that the transfer rails 29 are not connected to the connecting points 26, but are connected via the connecting points 52 to the bus bars 16.

A further difference is that the outlet terminals 27 in the distribution panel shown in FIG. 1 represent the feed-in panel 50 "inlets" for the feed-in panel 50 in FIG. 2 and are therefore referred to as feed-in connections 53.

For the most part, the same mechanical and electrical components can furthermore be used for the layout of the distribution panel 10 in FIG. 1 and the feed-in panel 50 in FIG. 2. In particular, the same housing 11, the same housings 15, 20, 24, 28, the same bus bars and transfer rails 16, 29, and the same disconnecting/grounding switches 17, 25, as well as the same circuit breakers 21 and disconnecting switches 30 can be used.

For the following explanation of the mode of operation, we proceed on the assumption that the electrical switchgear comprises at least one feed-in panel 50, as shown in FIG. 2, as well as a plurality of distribution panels 10 as shown in FIG. 1.

For a failure-free operation of the switchgear, electrical power is supplied via the feed-in connections 53 to the feed-in panel 50. This current is conducted further via the closed disconnecting/grounding switches 25, 17 and the closed circuit breakers 21 to the bus bars 16. The disconnecting switches 30 of the feed-in panel 50, however, are opened so that the current does not reach the transfer rails 29.

By way of the bus bars 16, the current is distributed to the distribution panels where the current is respectively conducted further via the closed disconnecting/grounding switches 17, 25 and the closed circuit breakers 21 to the outlet terminals 27 and thus to the respectively connected consumers. The disconnecting switches 30 of the distribution panels 10 are opened in that case.

We now assume that a malfunction occurs in one of the distribution panels 10 and that within the framework of protective functions, the circuit breakers 21 of this panel switch to the opened state, thereby interrupting the current flow. The consumer connected to the malfunctioning distribution panel 10 is therefore no longer supplied with current.

For explanatory purposes, we furthermore assume that only a single feed-in panel 50 exists and that its disconnecting switches 30 can be switched even if they are current-carrying. We want to point out that switching the disconnecting switches 30 in the current-carrying state is not permissible in practical operations. For that reason, the following explanations are of a rather theoretical nature and do not correspond to practical operations. However, if the disconnecting switches 30 are replaced with switching devices which can switch while under current, for example power switches or load switches, it is possible to also realize the aforementioned theoretical case in practical operations.

In this assumed theoretical case, the disconnecting switches 30 of the feed-in panel 50 can be closed so that current flows not only in the bus bars 16 but also in the transfer rails 29. The disconnecting switches 30 of the malfunctioning distribution panel 10 can furthermore be closed, so that the consumer connected to this distribution panel 10 is supplied with current via the transfer rails 29 and the disconnecting switch 30.

The connected consumer can thus be supplied with power even though the circuit breakers 21 of the malfunctioning distribution panel 10 are opened. Protective functions still exist in this state where power flows via the transfer rails 29. If another malfunction were to occur in this state, the power flowing from the circuit breakers 21 to the feed-in panel 50 would be interrupted.

For example if one of the circuit breakers 21 in the malfunctioning distribution panel 10 is defective, it is now possible to replace this circuit breaker 21. The disconnecting/grounding switches 17, 25 associated with the circuit breaker 21 and arranged on both sides thereof must be opened and grounded in that case, so that the defective circuit breaker 21 is cut off from the switchgear panel 10. The defective circuit breaker 21 can subsequently be removed in the above-described manner and a new circuit breaker 21 can be installed.

Following this, the associated disconnecting/grounding switches 17, 25 can be closed once more. Once the new circuit breaker 21 is also closed, the disconnecting switches 30 in the formerly defective distribution panel 10 and the feed-in panel 50 can be opened again, so that current only flows over the bus bars 16 and no longer over the transfer bars 29.

As explained, the closing and especially the opening of the disconnecting switches 30 for the feed-in panel 50 and the malfunctioning distribution panel 10 in the current-carrying state is not permissible in practical operations. Instead, the disconnecting switches 30 can be switched only if these are currentless. For example, this can be achieved by providing two feed-in panels 50, wherein this case, which corresponds to practical operations, is explained in the following.

By way of the first feed-in panel 50, the bus bars 16 are supplied with current via the closed circuit breakers 21, as described. The circuit breakers 21 of the second feed-in panel 50, however, are open. If a malfunction is detected in that case in one of the distribution panels 10, the disconnecting switches 30 in the malfunctioning distribution panel 10 and in the second feed-in panel 50 can be closed in the non-current carrying state, so that the circuit breakers 21 of the second feed-in panel 50 can be closed. The transfer rails 29 are thus supplied with current from the second feed-in panel 50 only after thereafter.

Once the malfunction is corrected and especially following a replacement of one of the circuit breakers 21 of the distribution panel 10, the circuit breakers 21 of the second feed-in panel 50 can be opened first and the transfer rails 29 can be switched to the non-current carrying state. Following this, the disconnecting switches 30 in the formerly defective distribution panel 10 and in the second feed-in panel 50 can be opened once more.

In this way, the power supply to the non-defective distribution panels 10 and thus to the connected consumers is not interrupted and even the current supply to the consumer connected to the defective distribution panel 10 is interrupted only briefly. The interruption interval is determined based on the time required for detecting the malfunction and closing of the disconnecting switches 30 and the circuit breaker 21 of the second feed-in panel 50. This time interval can be restricted to the millisecond range through corresponding measures.

For the following and further explanation of the mode of operation, we proceed from the example that the electrical switchgear is provided with at least two feed-in panels 50, as shown in FIG. 2, and a plurality of distribution panels 10 as shown in FIG. 1.

During the defect-free operation of the switchgear, the circuit breaker 21 of one of the two feed-in panels 50 is opened and the circuit breaker 21 of the other feed-in panel 50 is closed. As a result, no current flows in the first-mentioned feed-in panel 50. The disconnecting switches 30 of both feed-in panels 50 are furthermore also opened, meaning the bus bars 16 carry a current supplied by the second feed-in panel 50 while the transfer rails 29 do not carry any current.

The following measures can then be carried out for performing maintenance operations on the three circuit breakers 21 of one of the distribution panels 10.

The disconnecting switches 30 in the distribution panel 10 where maintenance is to be carried out on the circuit breakers 21 are closed. Since the transfer rails 29 do not carry any current, the disconnecting switches 30 are switched while in the currentless state.

Following this, the disconnecting switches 30 and the circuit breakers 21 are successively closed in the feed-in panel 50 which until then did not carry any current. As a result, the transfer rails 29 are now current-carrying. The disconnecting switches 30 in that case are switched while still currentless.

The circuit breakers 21 of the distribution panel 10 are then opened. The consumers connected to the distribution panel 10 are consequently supplied continuously with current via the transfer rails 29.

The disconnecting/grounding switches 17, 25 respectively assigned to the now disconnected circuit breakers 21 of the distribution panel 10 are subsequently switched, such that the circuit breakers 21 are respectively connected to ground on both sides.

The circuit breakers 21 of the aforementioned distribution panel 10 subsequently do not carry any voltage. Maintenance operations can thus be performed on these circuit breakers 21 and it is also possible to replace the circuit breakers 21.

Once the maintenance operations are completed, the disconnecting/grounding switches 17, 25 assigned to the circuit breakers 21 are switched again and the circuit breakers 21 of the distribution panel 10 are closed.

Following this, the circuit breakers 21 in one of the two feed-in panels 50 and subsequently also the disconnecting switches 30 in the aforementioned feed-in panel 50, as well as in the distribution panel 10 in which maintenance was performed, are opened. The transfer rails 29 are thus once more currentless. The disconnecting of the switches 30 occurs while these are in the currentless state.

One of the feed-in panels 50 is thus again without current and current is supplied continuously to the consumer connected to the distribution panel 10, but only via the bus bars 16.

The maintenance operations are thus completed and the switchgear is again in the starting state.

It is understood that maintenance on the individual circuit breakers 21 in one of the distribution panels 10 can also be carried out in the same way. If applicable, it is possible to carry out the above-described sequence only for the phase associated with the individual circuit breaker 21.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. Electrical three phase switchgear, comprising:
a distribution panel, including three circuit breakers, three bus bars, and three transfer rails, each bus bar and each transfer rail forming a pair that is connected to an associated one of three outlet terminals, each bus bar being connected to its associated outlet terminal via a respective one of the three circuit breakers, the three circuit breakers being housed inside a single circuit breaker housing, the three transfer rails being housed inside a single transfer rail housing that is separate from the circuit breaker housing, and the three transfer rails and respective electrical connections from the three transfer rails to the associated outlet terminals being arranged so as to bypass the three circuit breakers such that three phase power is supplied to a load via one or more of the three transfer rails if one or more of the three circuit breakers is removed from the circuit breaker housing or opened as a result of an operational error.

2. The electrical three phase switchgear according to claim 1, wherein at least one of the circuit breaker housing and the three circuit breakers are embodied such that the three circuit breakers are replaceable.

3. The electrical three phase switchgear according to claim 1, wherein the three circuit breakers are respectively connected, on both sides, to one disconnecting/grounding switch.

4. The electrical three phase switchgear according to claim 3, wherein each of the three circuit breakers are connected via one of the disconnecting/grounding switches to one of the three bus bars and via another of the disconnecting/grounding switches to one of the three outlet terminals.

5. The electrical three phase switchgear according to claim 4, wherein the three bus bars and the one of the disconnecting/grounding switches are arranged inside a bus bar housing.

6. The electrical three phase switchgear according to claim 5, wherein the another of the disconnecting/grounding switches is arranged inside a distribution panel housing.

7. The electrical three phase switchgear according to claim 1, wherein the three transfer rails are connected via a respective disconnecting switch to the three outlet terminals.

8. The electrical three phase switchgear according to claim 7, wherein the respective disconnecting switches arranged inside the transfer rail housing.

9. A distribution panel for electrical three phase switchgear, comprising:
three bus bars; and
three transfer rails, the three bus bars, each bus bar and each transfer rail forming a pair that is connected to an associated one of three outlet terminals, each bus bar being connected to its associated outlet terminal via a respective one of the three circuit breakers, the three circuit breakers being arranged inside a single circuit breaker housing, the three transfer rails being housed inside a single transfer rail housing that is separate from the circuit breaker housing, the three transfer rails and respective electrical connections from the three transfer rails to the associated outlet terminals being arranged so as to bypass the three circuit breakers such that three phase power is supplied to a load via one or more of the three transfer rails if one or more of the three circuit breakers is removed from the circuit breaker housing or opened as a result of an operational error.

10. A feed-in panel for three-phase electrical switchgear, comprising:

three bus bars; and three transfer rails, each bus bar and each and each transfer rail forming a pair that is connected to an associated one of three outlet terminals, each bus bar being connected to its associated outlet terminal via a respective one of the three circuit breakers, the three circuit breakers being housed inside a single circuit breaker housing, the three transfer rails being housed inside a single transfer rail housing that is separate from the circuit breaker housing, the three transfer rails and respective electrical connections from the three transfer rails to the associated outlet terminals being arranged so as to bypass the three circuit breakers such that three phase power is supplied to a load via one or more of the three transfer rails if one or more of the three circuit breakers is removed from the circuit breaker housing or opened as a result of an operational error.

11. A method for operating a distribution panel, comprising:

supplying a consumer connected to the distribution panel, during error-free operation, with current via three bus bars and three circuit breakers, the distribution panel including the three bus bars, the three circuit breakers, and three transfer rails, each bus bar and each and each transfer rail forming a pair that is connected to an associated one of three outlet terminals, each bus bar being connected to its associated outlet terminal via a respective one of the three circuit breakers, the three circuit breakers being housed inside a single circuit breaker housing, the three transfer rails being housed inside a single transfer rail housing that is separate from the circuit breaker housing, the three transfer rails and respective electrical connections from the three transfer rails to the associated outlet terminals being arranged so as to bypass the three circuit breakers such that three phase power is supplied to a load via one or more of the three transfer rails if one or more of the three circuit breakers is removed from the circuit breaker housing or opened as a result of an operational error; and opening one or more of the three circuit breakers of the distribution panel in case of an operational error or malfunction or for maintenance operations, and supplying the consumer connected to the distribution panel with current via one or more of the three transfer rails in response to the opening such that the consumer is supplied with three phase power while the one or more circuit breakers are open.

12. The method according to claim 11, further comprising:

performing maintenance operations on one or more of the three circuit breakers of the distribution panel or replacing one or more of the three circuit breakers.

13. The electrical three phase switchgear of claim 1, wherein the electrical switchgear is switchgear for distributing medium voltage.

14. The electrical three phase switchgear according to claim 1, wherein a portion of the electrical connections extending from the three transfer rails to the outlet terminals are housed inside the transfer rail housing.

15. The electrical three phase switchgear according to claim 14, wherein at least one of the circuit breaker housing and the three circuit breakers are embodied such that the three circuit breakers are replaceable.

16. The electrical three phase switchgear according to claim 4, wherein the another of the disconnecting/grounding switches is arranged inside a distribution panel housing.

17. The distribution panel for electrical three phase switchgear as claimed in claim 9, wherein the distribution panel is for three phase switchgear for distributing medium voltage.

18. The feed-in panel for electrical three phase switchgear as claimed in claim 10, wherein the feed-in panel is for medium-voltage distribution three phase switchgear.

* * * * *